US008327084B2

(12) United States Patent
von Praun et al.

(10) Patent No.: US 8,327,084 B2
(45) Date of Patent: Dec. 4, 2012

(54) METHOD AND APPARATUS TO TRIGGER SYNCHRONIZATION AND VALIDATION ACTIONS UPON MEMORY ACCESS

(75) Inventors: Christoph von Praun, Briarcliff Manor, NY (US); Luis Ceze, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 11/847,917

(22) Filed: Aug. 30, 2007

(65) Prior Publication Data

US 2009/0063783 A1  Mar. 5, 2009

(51) Int. Cl.
*G06F 12/14* (2006.01)
*G06F 12/10* (2006.01)

(52) U.S. Cl. ............ 711/150; 711/206; 711/E12.102; 711/E12.059

(58) Field of Classification Search .......... 711/150
See application file for complete search history.

(56) References Cited

U.S. PATENT DOCUMENTS

| 5,428,761 | A  | * | 6/1995  | Herlihy et al. | 711/130 |
| 7,823,013 | B1 | * | 10/2010 | O'Krafka et al. | 714/11  |
| 2008/0168239 | A1 | * | 7/2008 | Shen et al. | 711/154 |
| 2009/0031309 | A1 | * | 1/2009 | Lev | 718/101 |

OTHER PUBLICATIONS

Kai Li and Paul Hudak. "Memory Coherence in Shared Virtual Memory Systems." Nov. 1989. ACM. ACM Transactions on Computer Systems. vol. 7. No. 4. pp. 321-359.*
Kourosh Gharachorloo and Phillip B. Gibbons. "Detecting Violations of Sequential Consistency." 1991. ACM. SPAA 1991.*
Steven K. Reinhardt, Mark D. Hill, James R. Larus, Alvin R. Lebeck, James C. Lewis, and David A. Wood. "The Wisconsin Wind Tunnel: Virtual Prototyping of Parallel Computers." 1993. ACM. SIGMETRICS 1993.*
Martin C. Rinard and Monica S. Lam. "The Design, Implementation, and Evaluation of Jade." May 1998. ACM. ACM Transactions on Programming Languages and Systems. vol. 20. No. 3. pp. 483-545.*
Martin C. Rinard. "Implicitly synchronized abstract data types: data structures for modular parallel programming." 1998. Journal of Programming Languages. vol. 6. pp. 1-35.*
Mandana Vaziri, Frank Tip, and Julian Dolby. "Associating Synchronization Constraints with Data in an Object-Oriented Language." Jan. 2006. ACM. POPL 2006.*
Chen Ding, Xipeng Shen, Kirk Kelsey, Chris Tice, Ruke Huang, and Chengliang Zhang. "Software Behavior Oriented Parallelization." Jun. 2007. ACM. PLDI 2007.*

(Continued)

*Primary Examiner* — Charles Rones
*Assistant Examiner* — Nathan N Sadler
(74) *Attorney, Agent, or Firm* — Scully, Scott, Murphy & Presser, P.C.

(57) ABSTRACT

A system and method to trigger synchronization and validation actions at memory access, in one aspect, identifies a storage class associated with a region of shared memory being accessed by a thread, determines whether the thread holds the storage class and acquires the storage class if the thread does not hold the storage class, identifies a programmable action associated with the storage class and the thread, and triggers the programmable action. One or more storage classes are respectively associated with one or more regions of shared memory. An array of storage classes associated with a thread holds one or more storage classes acquired by the thread. A configurable action table associated with a thread indicates one or more programmable actions associated with a storage class.

20 Claims, 13 Drawing Sheets

OTHER PUBLICATIONS

Luis Ceze, Pablo Montesinos, Christoph von Praun, and Josep Torrellas. "Colorama: Architectural Support for Data-Centric Synchronization." Feb. 2007. IEEE. HPCA 2007.*

Luis Ceze, Christoph von Praun, Calin Cascaval, Pablo Montesinos, and Josep Torrellas. "Programming and Debugging Shared Memory Programs with Data Coloring." CPC 2009.*

John B. Carter. "Design of the Munin Distributed Shared Memory System." 1995. Academic Press. Journal of Parallel and Distributed Computing. vol. 29. pp. 219-227.*

John K. Bennett, John B. Carter, and Willy Zwaenepoel. "Munin: Distributed Shared Memory Based on Type-Specific Memory Coherence." Feb. 1990. ACM. PPoPP '90.*

Hsiao-His Wang et al. "A distributed shared memory system with self-adjusting coherence scheme." Jul. 1994. Elsevier. Parallel Computing. vol. 20.*

Emmett Witchel et al., Mondrian Memory Protection, San Jose, CA Copyright 2002.

* cited by examiner

Fig. 13

```
struct TQ {
    void* taskqueue[N];
    mutex_t lock;
    int head, tail, numwaiters;

void* get_task() {
        mutex_acquire (&lock);
        ...
        mutex_release (&lock);
        return ret;
    }                                                          1301
    void put_task(void* o) {
        mutex_acquire (&lock);
        ...
        mutex_release (&lock);
    }                                                          1302
};                                                             1303 mutex_acquire (mutex_t* lock) {
    col = lock_color_map.lookup(lock);
    if (col)
        acquire_color(lock);
    _original_mutex_acquire(lock);
} mutex_release (mutex_t* lock) {
    col = lock_color_map.lookup(lock);
    if (col)
        release_color(lock);
    _original_mutex_release(lock);
}                                                              1304

1305 ⟶ set_action(BLUE, not_held, __report_error)

struct tq;
1306 ⟶ set_color(&tq, sizeof(TQ), BLUE);
1307 ⟶ lock_color_map.put(tq.lock, BLUE);
```

METHOD AND APPARATUS TO TRIGGER SYNCHRONIZATION AND VALIDATION ACTIONS UPON MEMORY ACCESS

FIELD OF THE INVENTION

The present disclosure relates generally to a shared memory system in a multi-programmed computer system such as a multiprocessor or multicore system. In particular, the present disclosure relates to a method and apparatus that triggers programmable actions on memory access.

BACKGROUND OF THE INVENTION

A memory system allows a processor to store a datum at a certain address; such operation is called store operation. The processor may retrieve that datum subsequently from the memory system at that address; such operation is called load operation.

A shared memory system is a memory system that is accessed by several processors, e.g., in a multiprocessor computer. In such environment, a load operation issued by processor P1 may not return the value previously stored by P1, since a store operation issued by another processor P2 may have intervened between the store and load operation of P1.

Concurrent load and store operations that access the same shared memory location can be prevented by means of concurrency control. Common mechanisms for concurrency control are locks and transactions. Synchronization operations for locks are acquire and release. Synchronization actions for transactions are transaction start and transaction end.

The programming interfaces for locks and transactions require that synchronization actions are specified explicitly in the program. The explicit specification of concurrency control and the correct placement of synchronization operations in the control flow of a program is a difficult and error-prone task. Most defects in parallel software systems are related to incorrect synchronization and are due to the incorrect use and placement of synchronization operations. It would be desirable to unburden the programmer from placing synchronization operations and synthesize such operations automatically.

BRIEF SUMMARY OF THE INVENTION

A method and system to trigger synchronization and validation actions at memory access are provided. A method to trigger synchronization and validation actions at memory access, in one aspect, may comprise identifying a storage class associated with a region of shared memory being accessed by a thread, determining whether the thread holds the storage class and acquiring the storage class if the thread does not hold the storage class, identifying a programmable action associated with the storage class and the thread, and triggering the programmable action.

A system for triggering synchronization and validation actions at memory access, in one aspect, may comprise a memory system structure that maps one or more storage classes to respective one or more regions of shared memory. One or more arrays of storage classes are respectively associated with one or more threads executing in a processing unit. The one or more arrays are operable to hold one or more storage classes acquired by said respective one or more threads. One or more configurable action tables are respectively associated with said one or more threads executing in the processing unit. The one or more configurable action tables specify one or more configurable actions associated with one or more storage classes. A thread executing in the processing unit and attempting access to said one or more regions of shared memory causes one or more configurable actions to be triggered based on content of an array of storage classes and a configurable action table associated with said thread.

A program storage device readable by a machine, tangibly embodying a program of instructions executable by the machine to perform the above method to trigger synchronization and validation actions at memory access may also be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 13 illustrates an example for validating a locking policy, Taskqueue, in one embodiment of the present disclosure.

DETAILED DESCRIPTION

A method and systems in one embodiment infer synchronization operations from the dynamic instruction stream of a program. A method associates a storage class or storage structure or like, referred to as color in this disclosure, with a region of memory. A system includes a mechanism to dynamically manage the mapping of addresses to colors. The system may also include a mechanism that allows threads to acquire and release colors during program execution, wherein 'thread' refers to a program-level entity (software thread) in the following. Unlike locks, colors are not exclusive to a thread. A thread is said to hold a color if it acquired the color and did not release it. The set of colors that a thread holds is referred to as color context in this disclosure. The system may also have a mechanism that tracks the color context for each software thread. Still yet, the system may include a mechanism to trigger programmable actions upon memory access based on a configurable condition. The condition can be parameterized with the color context, the color of the accessed location.

In one embodiment of the method to trigger synchronization operations at data access using the aforementioned features, a region of shared memory that needs to be guarded against concurrent conflicting access is mapped to some color at allocation time. A programmable action may be installed as follows: whenever a thread accesses a datum in a colored region and does not hold the corresponding color, then an action is raised that acquires the color and executes a synchronization operation that guards the colored region of memory from concurrent access, for example, lock acquire, transaction start. Hence the concurrency control operation that starts a critical section is implicit.

The synchronization operation, such as lock release and transaction end, that terminates the critical section is explicit, for example, specified by the programmer or inserted by a compiler according to some convention that follows the static program structure.

Figure 1:
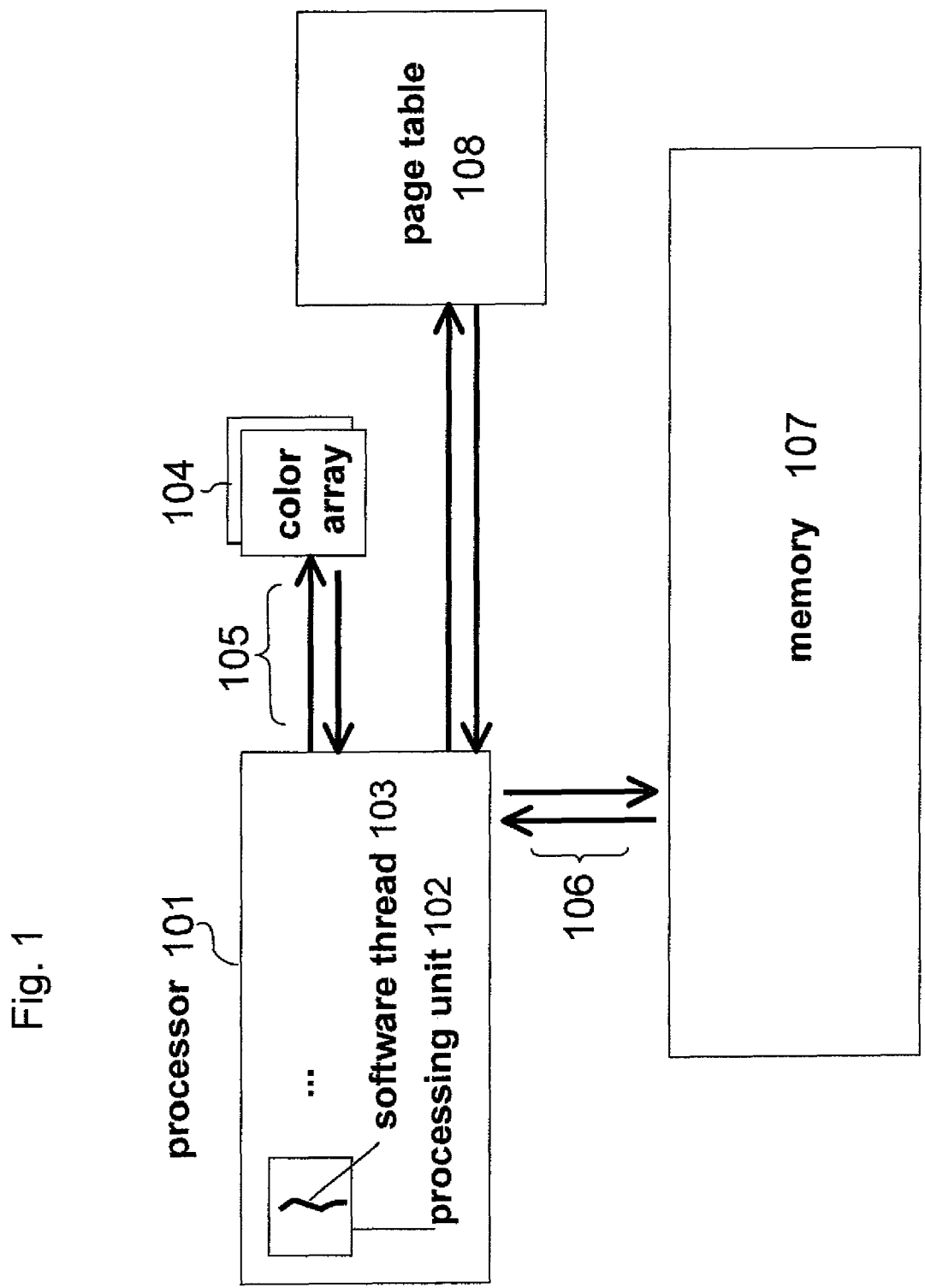
FIG. 1 illustrates an architectural diagram showing system components in one embodiment of the present disclosure.

FIG. 1 illustrates an architectural diagram showing system components in one embodiment of the present disclosure. A processor 101 such as a microprocessor may include one or multiple processing units 102 with processor cores, hardware threads and software threads 103. A processor 101 can be multi-programmed, i.e., several software threads can execute concurrently. There may exist multiple color arrays 104, one for each software thread. For each software thread 103, a color array 104 tracks one or more colors 104 that the software thread 103 holds. One or more colors that a thread holds is referred to as color context for that thread. The processor 101 updates (as shown by arrows at 105) this color structure when a thread acquires or releases a color. Also as shown by arrows at 105, the processor 101 may efficiently access (e.g., read and write) the color structure 104 when a thread performs load and store accesses (shown at 106) to memory 107. The memory 107 in one embodiment is shared and may be accessible to all processing units. In one embodiment, information about the coloring of memory regions is kept in a page table 108.

Figure 2:
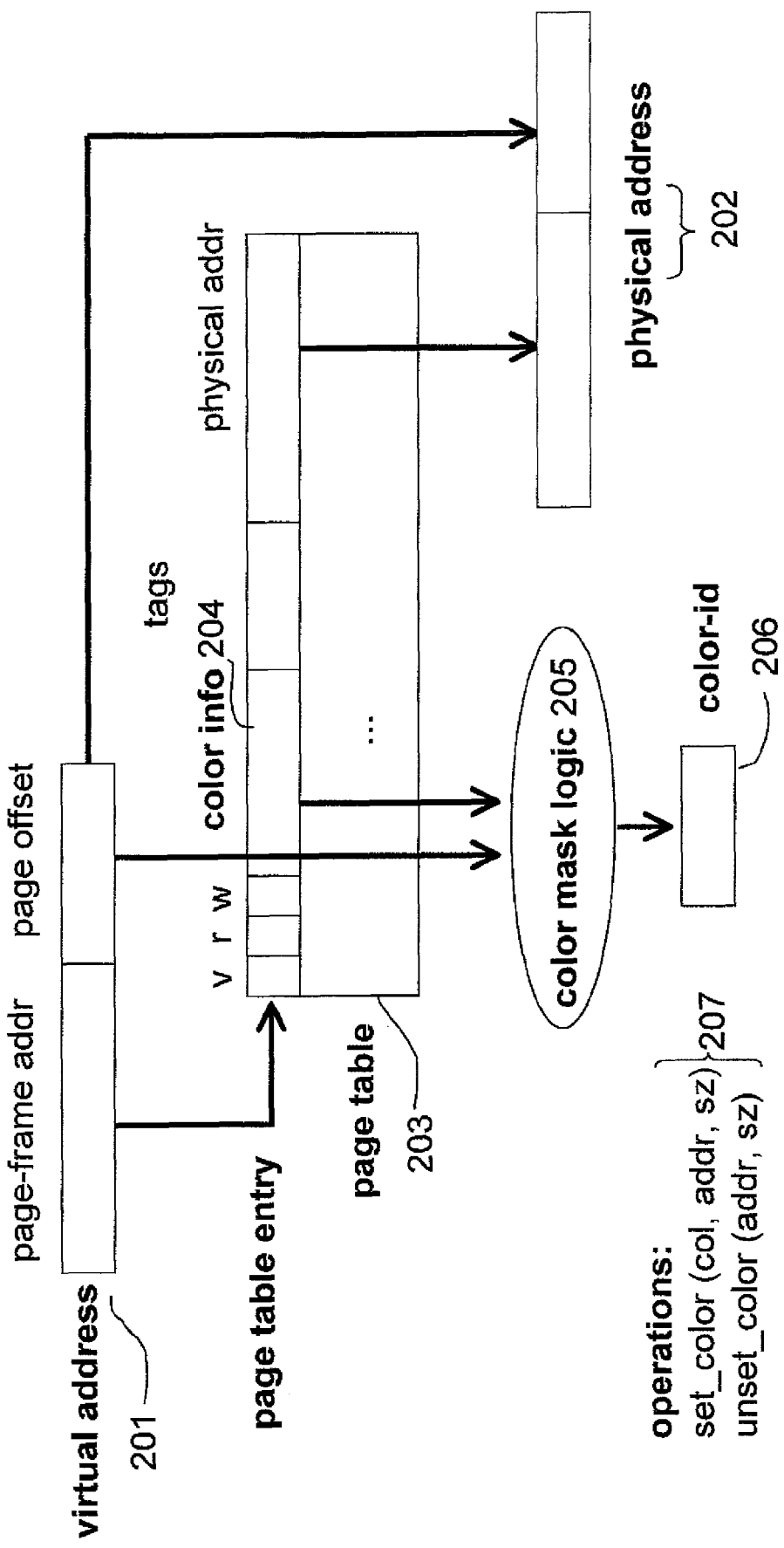
FIG. 2 illustrates a one-level page table with extensions of color information per page table entry in one embodiment of the present disclosure.

FIG. 2 illustrates a virtual memory system with one-level page table providing extensions of color information per page table entry in one embodiment of the present disclosure. A virtual address 201 may include two parts, the page-frame address and a page offset part. A page table 203 serves to translate a virtual address into a physical address 202. A page table 203 can hold multiple page table entries that are indexed by the page frame address. The method and system of the present disclosure in one embodiment extends an entry of a conventional page table with a color info (information) field 204 that specifies the coloring information of individual locations or memory region corresponding to this page table entry. A color mask logic 205 serves to determine from the color info field of the page entry the color of an individual address 206. For instance, the color mask logic 205 maps the offset inside a page to the corresponding color id in the color info field in the page table entry. Examples of operations 207 that may be used to program the color info field in the page table may includes set_color and unset_color. While FIG. 2 described color information as being specified in the page table entries, in another embodiment, auxiliary structures in the address translation, such as TLB structures, may also hold and/or cache color information.

Figure 3:
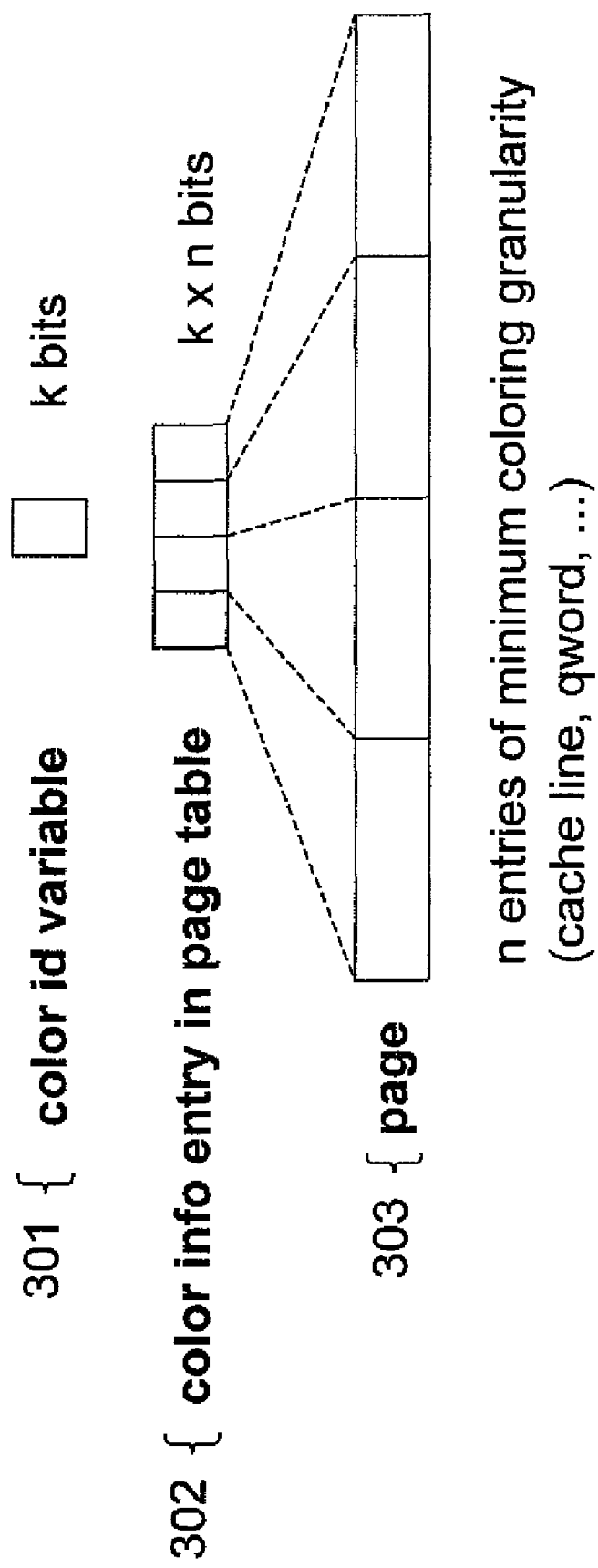
FIG. 3 illustrates detailed structure of the color info field in the page table entry in one embodiment of the present disclosure.

FIG. 3 illustrates detailed structure of the color info field in the page table entry in one embodiment of the present disclosure. Coloring is a mapping from addresses to the color space. A color may be represented by a fixed number of bits. For instance, colors are encoded as numbers in k-bit wide variables 301, permitting a maximum number of $2^k-1$ distinct colors. A color info field 302 in the page table entry holds an array of color id (identifier) variables 301. Each color id variable holds color information for a part of the address range covered by the memory page 303. The number of entries, n, reflects the granularity at which the system can assign different colors to memory. A 128 byte line granularity in a 4 k page would require, for example, 32 color variable entries in the color info field. Thus, memory can be assigned a color at a certain granularity, for example, per cache line or finer.

Figure 4:
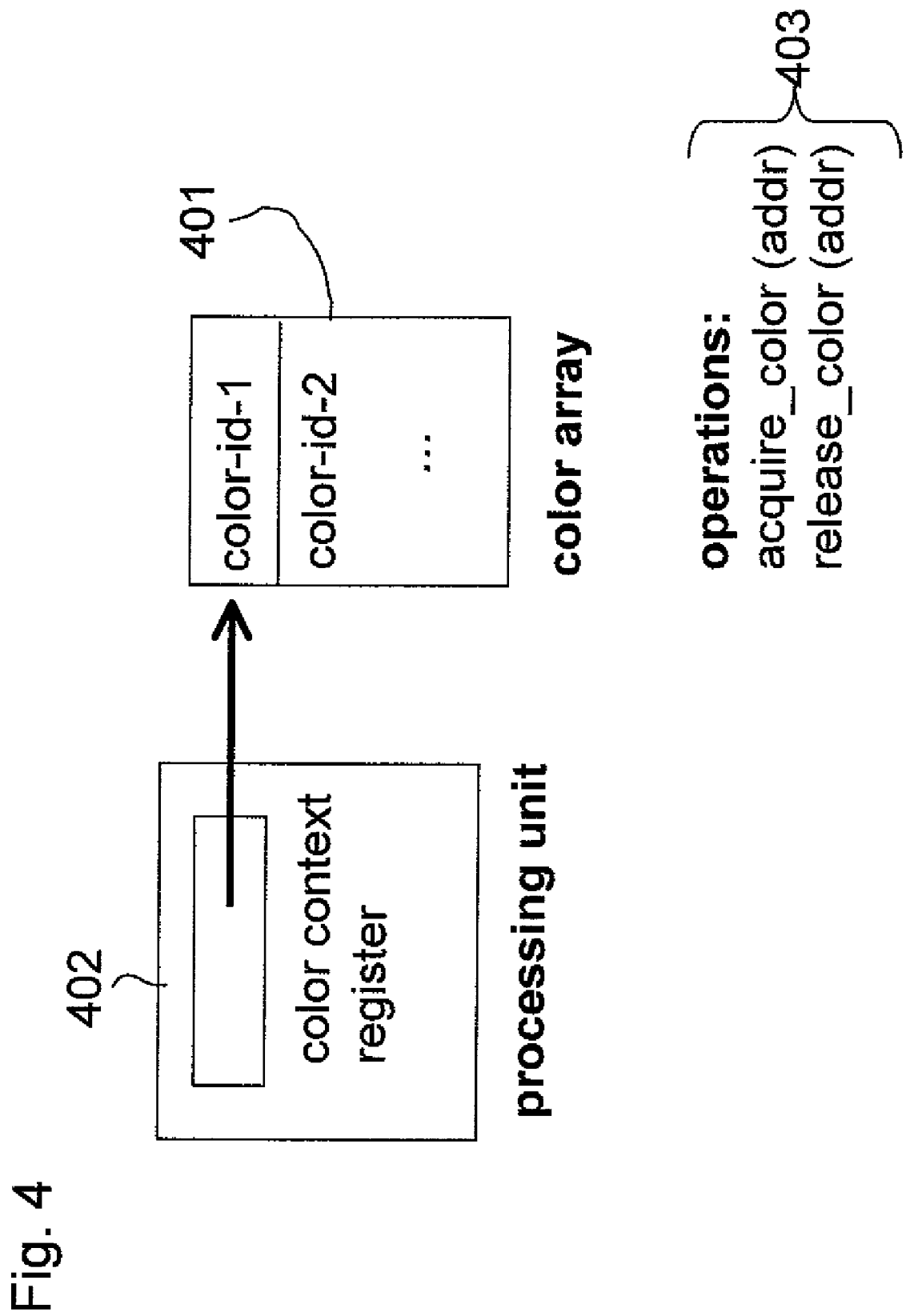
FIG. 4 illustrates color array data structure and a color context register in one embodiment of the present disclosure.

FIG. 4 illustrates color array data structure and a color context register through which the color array data structure may be accessed in one embodiment of the present disclosure. In one embodiment, a color array 401 is a system data structure that is private to each thread, for example, software thread. It is conceptually held in memory and accessed through a color context register 402. A color array 401 keeps track of the set of colors acquired by a thread. The information in the color array is accessed to determine the need of triggering a programmable action, when a thread performs load and/or store memory access. In one embodiment, an implementation may choose to cache the color array information in a lookaside buffer inside a processor for efficient read access to this structure. A color array may be modified through acquire and release operations 403 provided in the present disclosure in one embodiment. Those operations may be exposed in the programming interface or instruction set of the architecture.

Figure 5:
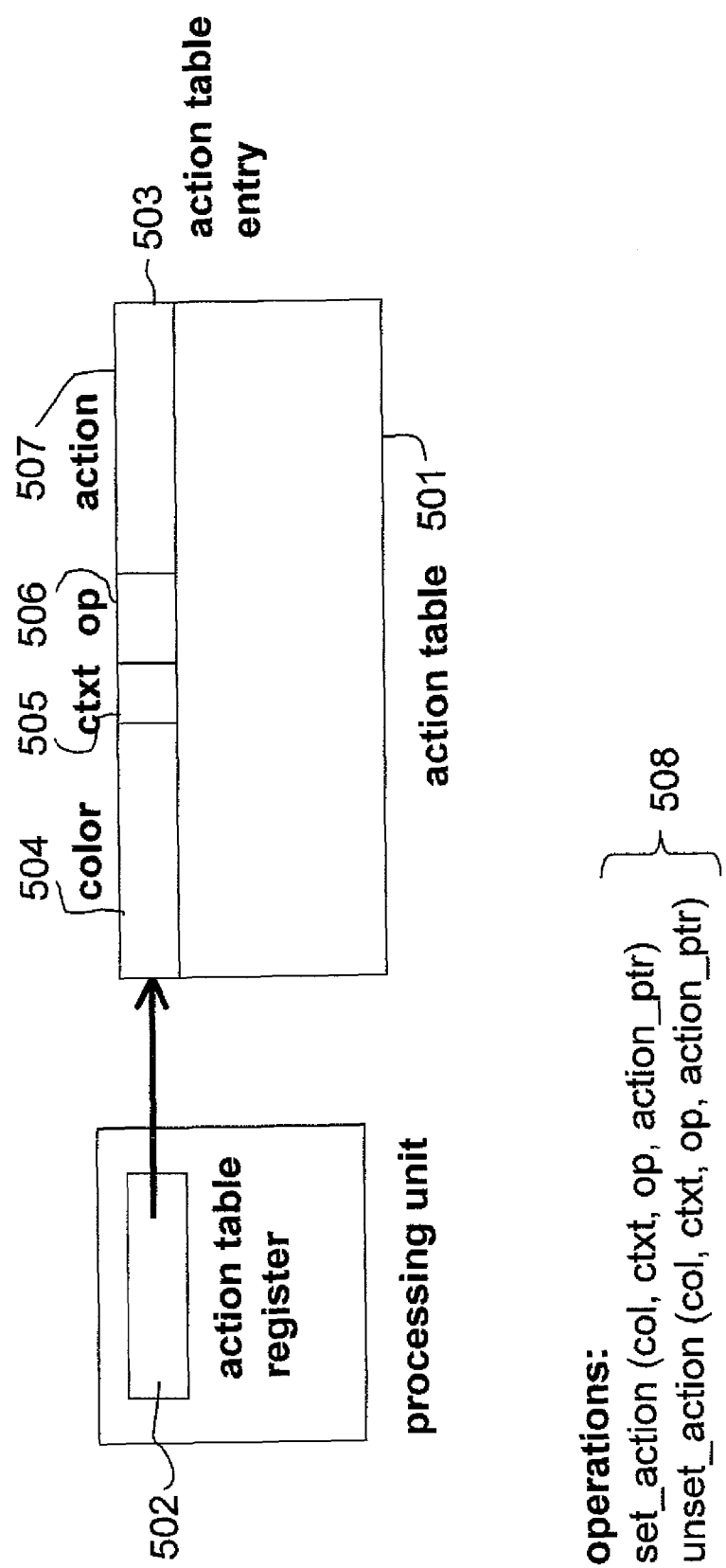
FIG. 5 illustrates a configurable action table and an action table register in one embodiment of the present disclosure.

FIG. 5 illustrates a configurable action table and an action table register through which the configurable action table may be accessed in one embodiment of the present disclosure. A configurable action table 501 is a process specific data structure similar to the page table. This table 501 encodes the conditions upon which a memory access should trigger an action. That is, in one embodiment, the conditions that determine if an action should be triggered are encoded in the action table 501. Similar to the color array, action table 501 is programmable, conceptually held in memory, and accessed through a special purpose register, the action table register 502. An action table entry 503 may include a color id (k-bits) 504, which specifies a color to which this action is related, a context (1-bit) 505 that specifies whether the action should be taken upon color held or not held, operation field (2-bits) 506 that specifies if the action should be invoked at read, write, or read and write, and an action specification 507, for example, function pointer. Entries in the action table can be registered and removed through functions 508 such as set_action and unset_action.

Load and store operations may trigger actions on configurable conditions using, for example, the following predicates: color of the accessed location, color context of accessing thread, i.e., current color array, type of memory access such as load and store. For example, at a load or store access, the following information is matched in the action table in one embodiment: color of the accessed memory 504; if the color is part of the current color context or not 505; the type of the operation, for example, whether the operation is a load or a store 506. If all conditions can be matched, then the corresponding action specified by a function in field action 507 is triggered and occurs before the memory access occurs.

Figure 6:
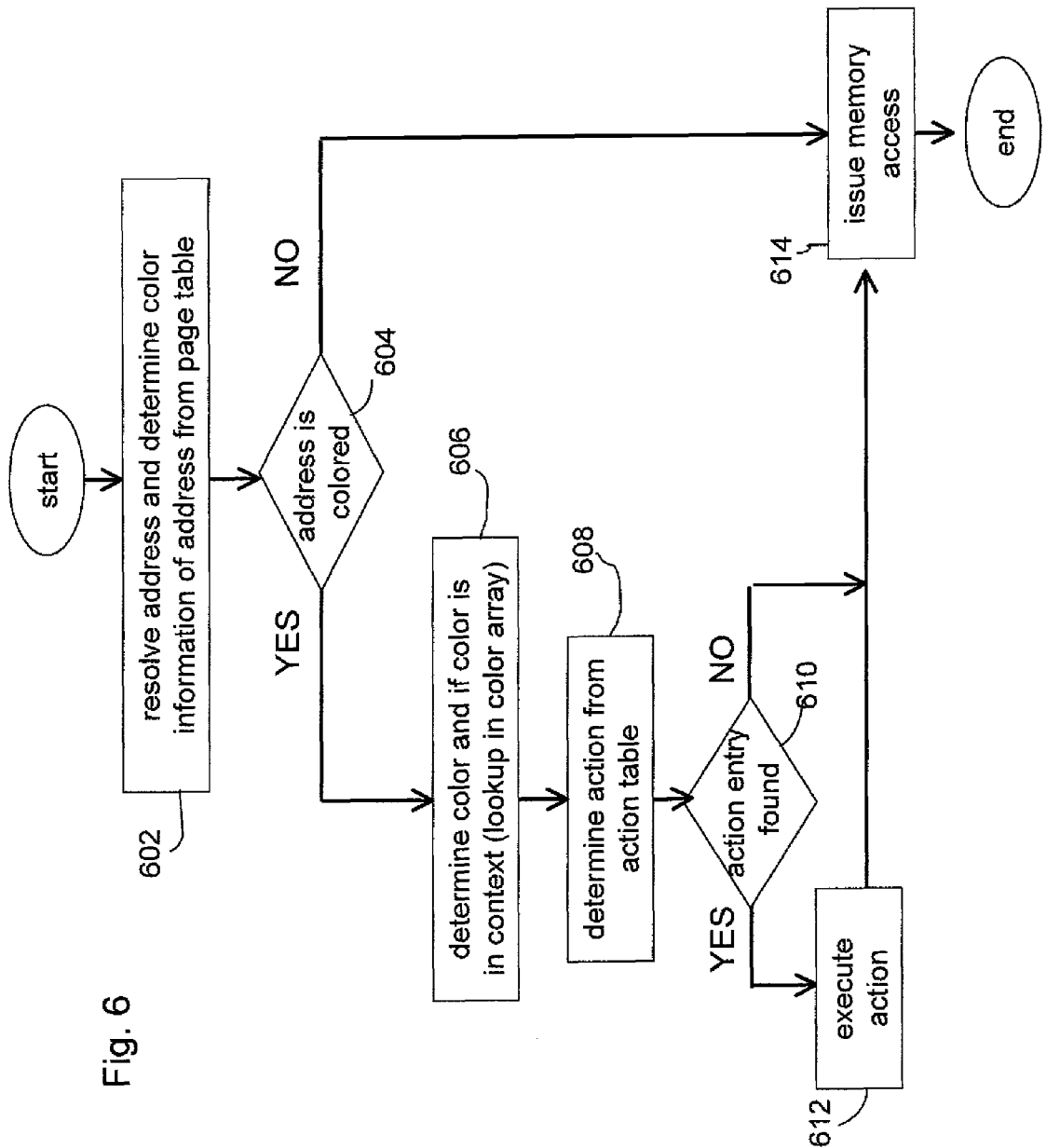
FIG. 6 illustrates logic in one embodiment of the present disclosure that decides if action should be triggered upon memory access.

FIG. 6 illustrates logic in one embodiment of the present disclosure that decides if an action should be triggered upon memory access. At 602, the processor that executes the memory access resolves the target address of the access operation, i.e., performs the virtual to physical address translation, and determines color information of the target address from the page table or cached parts of the relevant page table entry. At 604, it is determined whether the address is colored, that is, the address has color structure associated with it. An address would be colored if, for example, the page table entry or like includes color information for this address. If it is determined that the address is not colored, the logic proceeds to step 614 where a memory access is issued in a normal manner. If the address is colored, the color is determined at 606 and whether the color is in context, that is, whether the current thread is holding the color. Color may be determined from the page table entry structure or like as shown and described with reference to FIG. 2. Whether the color is in context may be determined by looking up the color array associated with the current thread and matching the color with the color ids specified in that color array, for instance, as shown in FIG. 4. At 608, action is determined from action table, for instance, by accessing the action table register or like associated with the current thread as shown in FIG. 5. At 610, if an action entry is found in the action table that matches this color, the action indicated in the action table entry is executed at 612. At 614, memory access is issued. At 610, if no action entry is found, the process proceeds to step 614.

Figure 7:
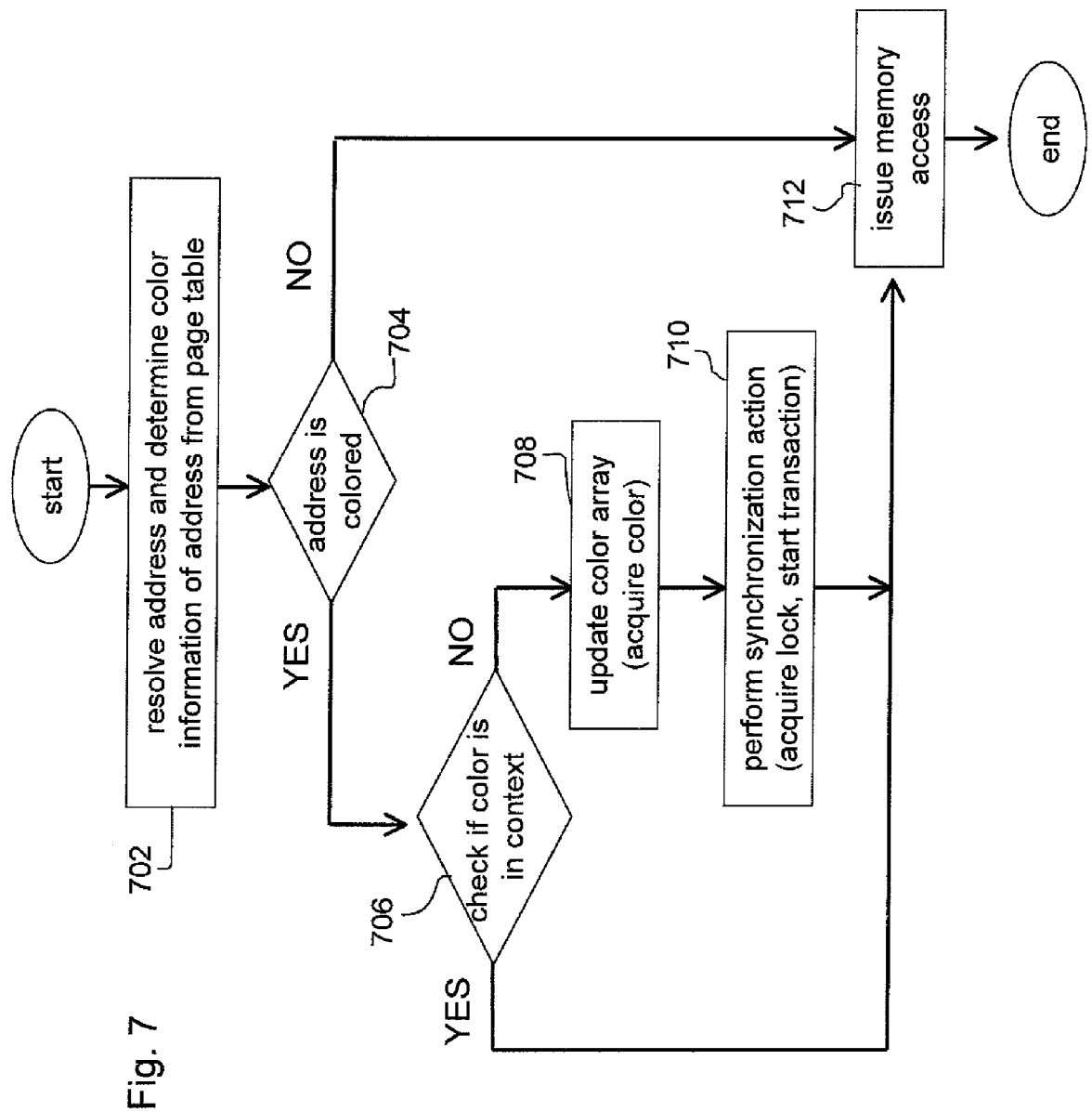
FIG. 7 illustrates logic in one embodiment of the present disclosure for invocation synchronization action at data access.

FIG. 7 illustrates logic in one embodiment of the present disclosure for invoking synchronization action at data or memory access. FIG. 7 is an example of a specific use case of the logic shown in FIG. 6. Upon execution of the memory access operation, the processor transfers execution to the programmable action (i.e., the programmable action is invoked by the processor), executes the action and returns to the point of execution of the original memory access (that caused execution of the action). At 702, a processor resolves an address and determines color information of the address from a page table or like. At 704, it is determined whether the address is colored. If the address is not colored, the logic proceeds to step 712. If the address is colored, it is checked whether the color is in context at 706, that is, if the current thread holds the color. This may be done, for example, by looking up the color associated with the memory region being accessed and looking up the color array associated with the current thread. If the color is in context, the logic proceeds to step 712. If the color is not in context, the color array is updated at 708 so that the thread acquires the color. In one aspect, one and the same color can be acquired by multiple threads. The software handler invoked due to the memory action may find out that the color is acquired by another software thread and take desired action, for example, delay execution, sleep, etc. At 710, synchronization action is performed. Examples of synchronization actions may include but are not limited to acquire lock and start transaction. At 712, memory access is issued. For instance, a processor and/or hardware submits memory access to the memory subsystem (e.g., to store and/or retrieve a value). Such memory issue actions occur due to a load and/or store instruction in the program (e.g., software).

Figure 8:
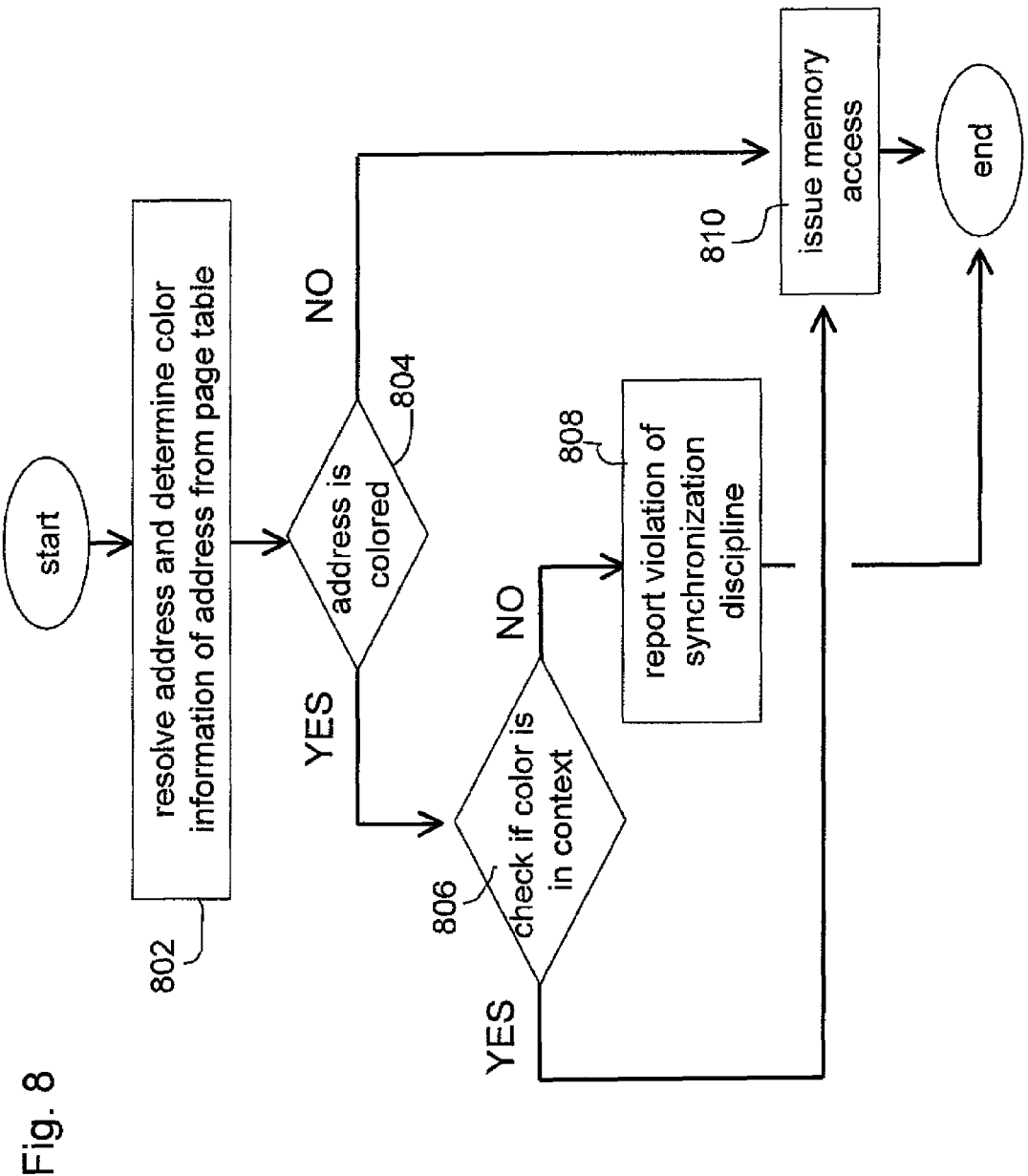
FIG. 8 illustrates logic in one embodiment of the present disclosure for validating synchronization discipline, for example, memory access.

FIG. 8 illustrates logic in one embodiment of the present disclosure for validating synchronization discipline, for example, memory access. FIG. 8 illustrates how an action to detect violations of a synchronization policy (e.g., access to colored data without holding a lock) may be implemented. At 802, a processor resolves an address of memory being accessed and determines color information of the address being accessed from a page table or like. At 804, a check is performed to determine if the address is colored. If the address is not colored, meaning that no color structure is associated with the address, the logic proceeds to step 810 where memory access is issued to access the memory in a normal manner. If the address is colored, a check is made at 806 to determine if color is in context, that is, the current thread holds the color. If so, memory access is issued at 810 to access the memory. Otherwise, if the color is not in context meaning that the current thread has not acquired the address, violation of synchronization discipline is reported at 808 since this signals that there was an attempt to access colored data without holding a lock.

Figure 9:
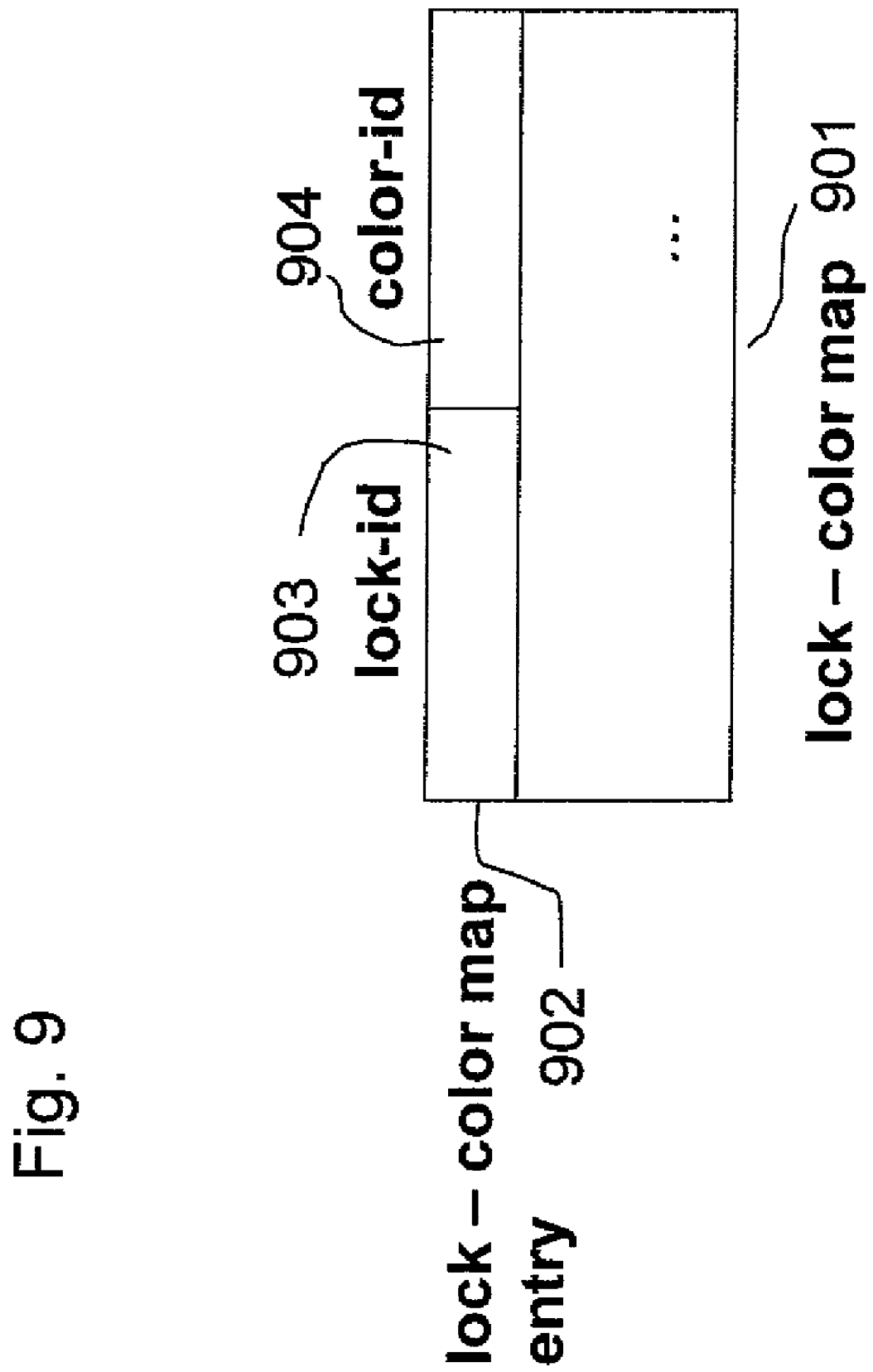
FIG. 9 illustrates a lock-color map (lock acquire) in one embodiment of the present disclosure.

FIG. 9 illustrates a lock-color map (lock acquire) in one embodiment of the present disclosure. A lock-color map is a data structure that supports the validation of a synchronization discipline with the shared memory system described in the present disclosure. In one embodiment the structure is allocated in memory and accessed by the configurable actions that are triggered during the execution of the program that should be validated. Actions are triggered at memory access, lock acquire, and lock release, for example. An entry in a color-lock map 902 in one embodiment may include a lock-id (identifier) field 903 that specifies a lock (pointer) and a color-id entry 904 that specifies the color of variables protected by the lock specified in the lock-id field.

Figure 10:
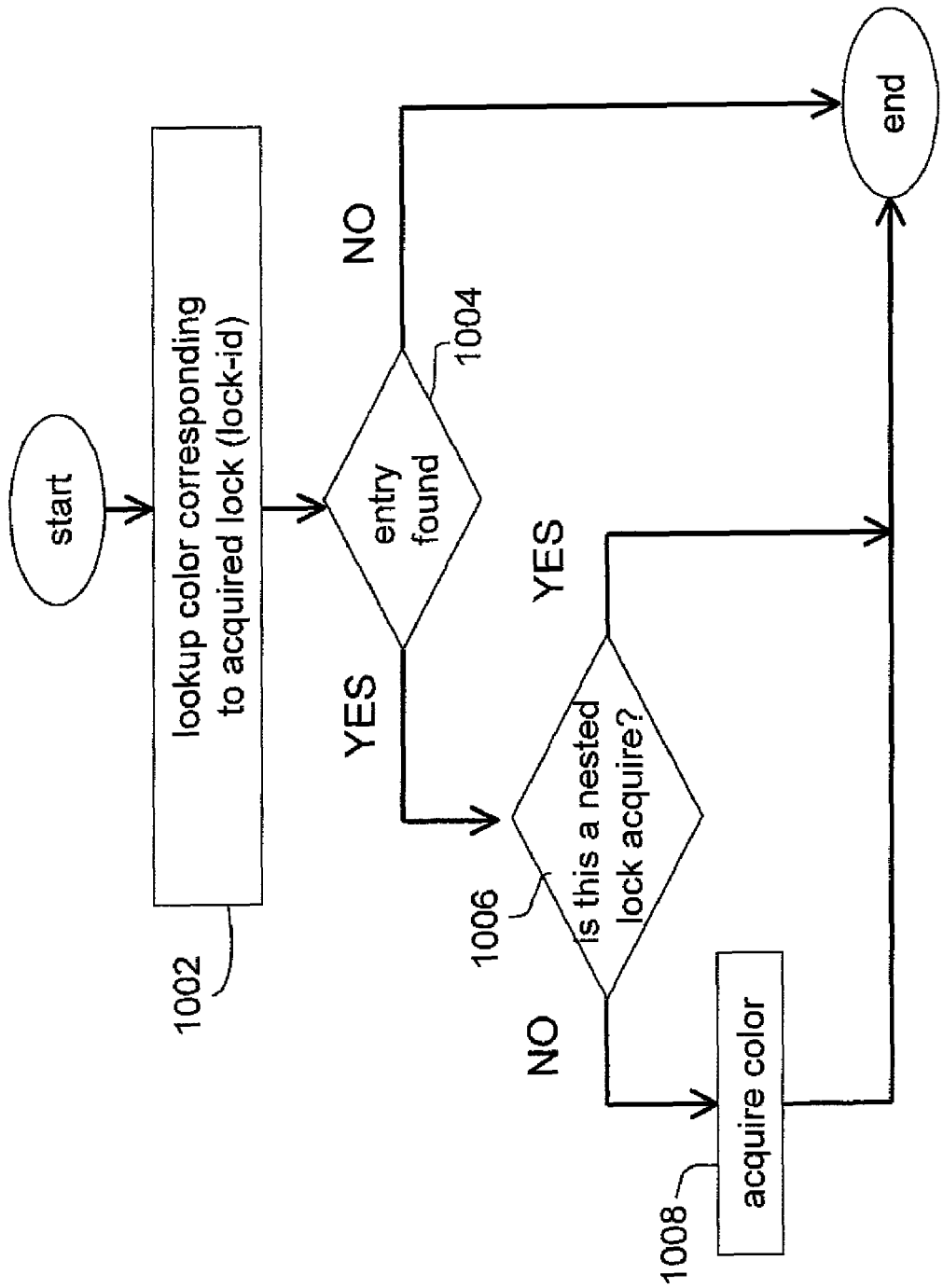
FIG. 10 illustrates logic for validating synchronization discipline, for example, lock acquire, in one embodiment of the present disclosure.

FIG. 10 illustrates logic for validating synchronization discipline, for example, lock acquire, in one embodiment of the present disclosure. At 1002, a processor looks up color corresponding to acquired lock, for instance, from a structure shown in FIG. 9 or like. A program may specify a correspondence between colors and locks, for example, at program start or when locks and data structures are allocated. At memory access, programmable actions refer to the data structure that specifies this mapping from locks to colors to execute the described logic. At 1004, it is determined whether an entry is found in the action table. If there is an entry, it is determined if this is a nested lock acquire at 1006, that is, an acquire operation on a lock that is already held by the current thread. In this description, we assume that the nesting level is recorded in the lock data, which is common for lock implementations, or by the system. If it is not a nested lock acquire, then at 1008, color is acquired, for example, an entry is added to the color array (401) corresponding to this thread. The lock and the acquire operation thereof are part of the program for which a locking policy is to be checked. If at 1004, if no entry is found, or at 1006, it is determined that there is no nested lock acquire, the logic returns.

Figure 11:
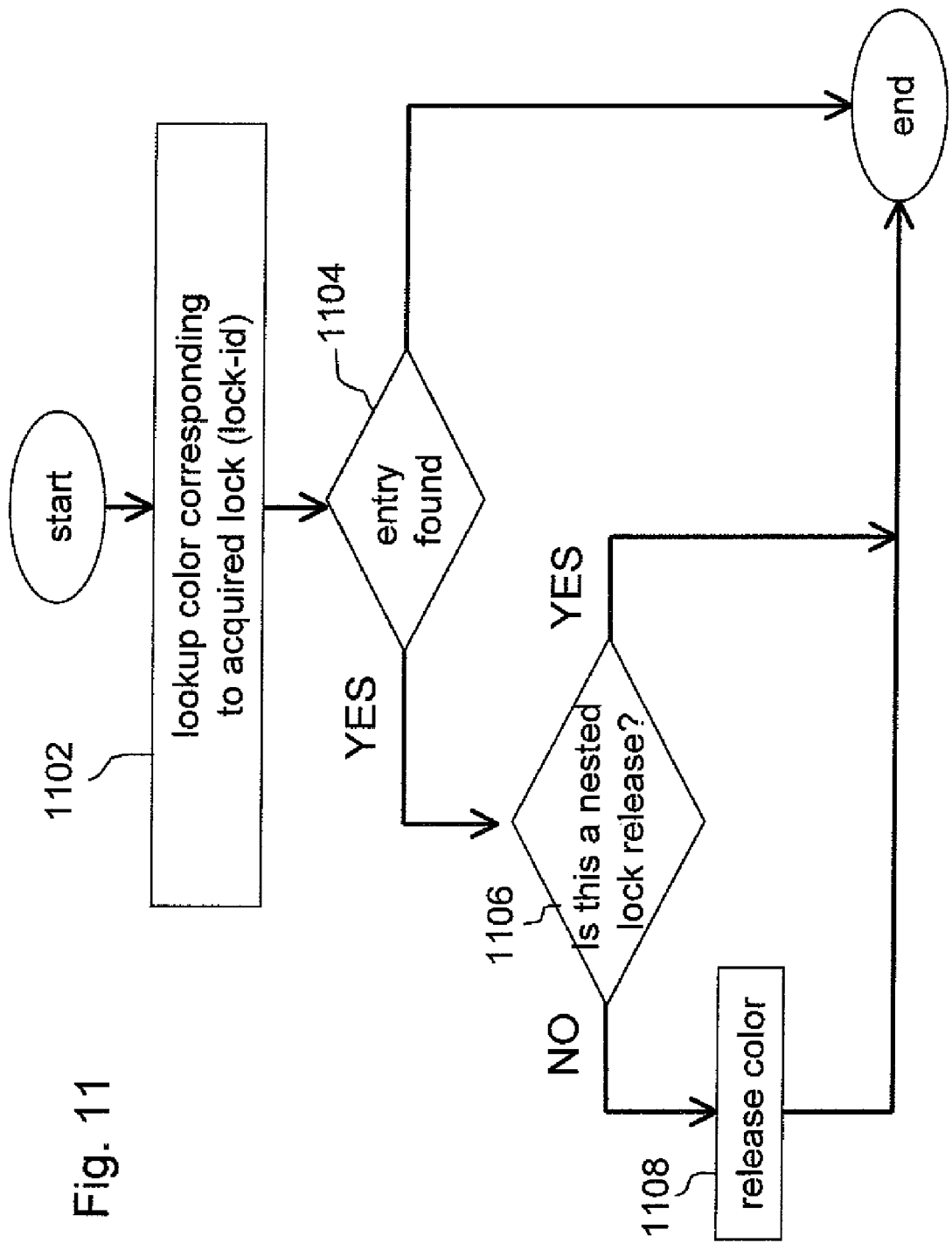
FIG. 11 illustrates logic for validating synchronization discipline, for example, lock release, in one embodiment of the present disclosure.

FIG. 11 illustrates logic for validating synchronization discipline, for example, lock release, in one embodiment of the present disclosure. At 1102, a processor looks up a color corresponding to acquired lock. At 1104, it is determined if an entry is found. If there is an entry, it is determined if this is a nested lock acquire at 1106. If it is not a nested lock acquire, then at 1108, color is released. If at 1104, if no entry is found, or at 1006, it is determined that it is a nested lock acquire, the logic returns.

Figure 12:
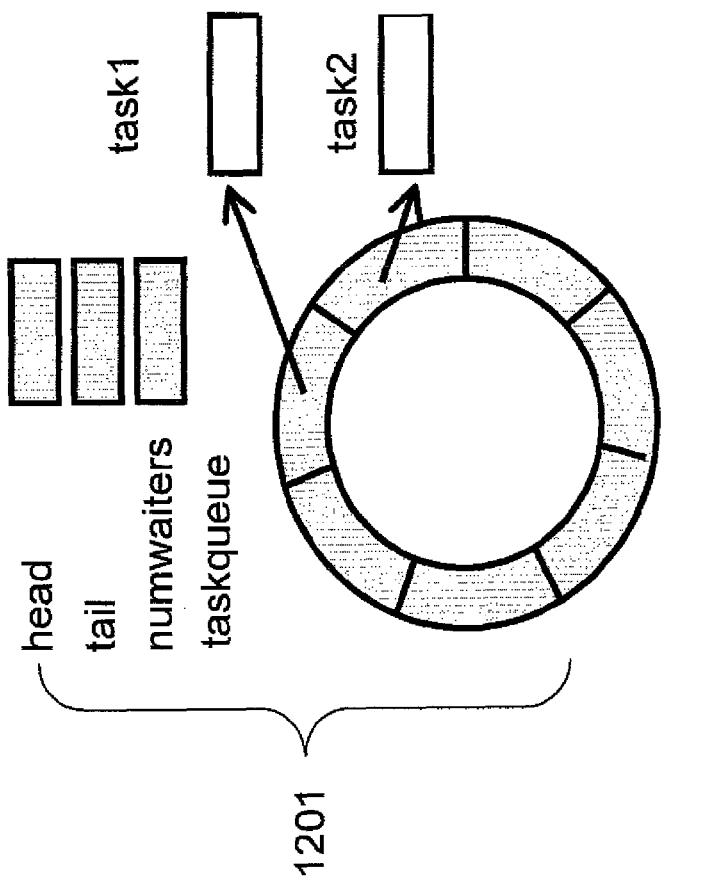
FIG. 12 illustrates an example of inferring synchronization action Taskqueue in one embodiment of the present disclosure.

FIG. 12 illustrates an example of inferring synchronization action, Taskqueue, in one embodiment of the present disclosure. A task queue data structure may include a buffer 1201 that holds pointers to the tasks and other fields that record the current state of the queue. It is assumed that multiple software threads operate concurrently on the structure. The illustrated functionality of the task queue is to obtain a task from the queue (get_task) and to add a task to the queue (put_task).

Concurrency control in the form of transactions or mutual exclusion locks shown in FIG. 13, may be employed to prevent concurrent interfering accesses. Code sections that relate to operations in the architecture described in this disclosure are shown at 1203.

The structure shown in FIG. 12 also enables supporting data-centric synchronization. Variables and data structures that are subject to data centric-concurrency control are allocated in colored memory as shown by operation at 1206. An action handler is registered for the case where colored memory is accessed and the corresponding color is not held, i.e., the color is not found in the color array of the current thread. The action handler adds the color corresponding to the accessed memory to the color array of the current thread and starts a critical section as shown at 1204. This action is triggered implicitly upon first access to 1203, 1204, and/or 1206. The critical section is terminated at the end of the method as shown in 1202 and 1203. The call to the _epilogue at 1202 can be generated automatically by the compiler, wherein epilogue achieves the following: first the critical section is terminated and then all color(s) effectively acquired during execution of this method are released; the precise set of colors to be released can be tracked dynamically by the ran-time system. Extensions of this mechanism enables correct operation of nested method and synchronization invocation may be implemented in the similar manner.

FIG. 13 illustrates an example for validating a locking policy, Taskqueue, in one embodiment of the present disclosure, and an example for the operation in one embodiment of the present disclosure to detect synchronization defects, i.e., violation of a locking policy. The locking policy to be checked in this example states that access to shared memory locations that belong to a specific data structure, Taskqueue, occurs only in the dynamic scope of a critical section. If locks are used to guard critical sections, then there must exist a unique lock that is held at every access to that location/data structure. A potential synchronization defect is detected when a violation of this locking policy occurs. In one embodiment of the present disclosure, there is a one-to-one mapping between colors and locks in the system. In this embodiment, this mapping is encoded in a color-lock map (for example, shown in FIG. 9, 901 that maps a lock-id 903) to a color-id (for example, FIG. 9, 904). The mapping recorded in the lock-color map is maintained by a programmer, for example, (as shown by an operation in FIG. 13, 1307), when shared data is allocated and colored (as shown by an operation in FIG. 13, 1306). The original explicit synchronization operations that delimit critical sections (1301 and 1302) are overridden such that colors are acquired at critical section start (1303), and released the end of the critical section (1304). The action table is configured at 1305 such that a violation of the locking discipline is reported if colored memory is accessed and the corresponding color is not found in the color array.

A unique multi-programmed computer system such as multiprocessor and/or multicore with shared memory is provided that can associate a storage class (color) with a region of memory. The computer system can track a color context for a computational thread and can trigger programmable actions in response to memory operations, configurable with the color context, the color of the accessed memory, and the processor condition registers. A method of using the aforementioned apparatus to implement programming models with data centric synchronization is also provided.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method to trigger synchronization and validation actions at memory access, comprising:

identifying a storage class associated with a region of shared memory being accessed by a thread, in a memory system having the shared memory in which one or more regions at a predetermined granularity are assigned storage classes, the storage class represented as a fixed number of bits that identify the storage class, and in response to determining that no storage class is identified with the region of shared memory being accessed by the thread, issuing memory access in normal manner, and in response to identifying the storage class, performing:

determining whether the thread holds the storage class and acquiring the storage class automatically if the thread does not hold the storage class, the acquiring including holding the storage class in an array of storage classes in the thread's own memory context such that the array of storage classes is private to the thread and wherein the storage class is not exclusive to a thread such that the same storage class can be acquired by multiple threads;

identifying a programmable action associated with the storage class held by the thread, the identifying including looking up an action table storing one or more storage classes and associated programmable actions in response to identifying the storage class associated with a region of shared memory being accessed by a thread, the action table being a process specific data structure that is configurable, including encoding of an action related to the storage class, a context that specifies whether the action should be taken upon the storage class held or not held, an operation that specifies if the action should be invoked at read, write, or read and write, and an action specification, entries in the action table enabled to be registered and removed through a set of predetermined functions; and triggering the programmable action based on the storage class assigned to the accessed shared memory location, the thread's array of storage classes, and type of memory access.

2. The method of claim 1, wherein the programmable action includes one or more synchronization actions.

3. The method of claim 1, wherein the programmable action includes one or more validation actions.

4. The method of claim 1, further including:
assigning one or more storage classes respectively to one or more regions of shared memory.

5. The method of claim 4, further including:
using virtual memory mapping structure for assigning said one or more storage classes respectively to one or more regions of shared memory, wherein the virtual memory mapping structure identifies whether the region of shared memory has an assigned storage class, and wherein said one or more regions of shared memory are respectively assigned said one or more storage classes by performing a set operation provided for programming the virtual memory mapping structure, wherein the set operation sets the fixed number of bits in an information field of the virtual memory mapping structure, wherein the virtual memory mapping structure is a virtual memory address to physical memory address translation table.

6. The method of claim 5, wherein the step of using includes:
extending a page table entry to include a storage field class.

7. The method of claim 4, wherein said one or more storage classes is respectively associated with said one or more regions of shared memory at a selected level of granularity.

8. The method of claim 4, further including:
establishing the array of storage classes, the array holding one or more storage classes that the thread has acquired.

9. The method of claim 4, further including:
establishing a configurable action table and associating the configurable action table with the thread, the configurable action table specifying one or more programmable actions associated with a storage class.

10. A system for triggering synchronization and validation actions at memory access, comprising:
a processing unit;
a memory system structure that maps one or more storage classes to respective one or more regions of shared memory, in a memory system having the shared memory in which one or more regions at a predetermined granularity are assigned storage classes, the storage class represented as a fixed number of bits that identify the storage class;
one or more arrays of storage classes respectively associated with one or more threads executing in the processing unit, one array for each thread, said one or more arrays operable to hold one or more storage classes acquired by said respective one or more threads and wherein the storage class is not exclusive to a thread such that the same storage class can be acquired by multiple threads; and
one or more configurable action tables respectively associated with said one or more threads executing in the processing unit, said one or more configurable action tables specifying one or more configurable actions associated with one or more storage classes, the configurable action table being a process specific data structure that is configurable, including encoding of an action related to the storage class, a context that specifies whether the action should be taken upon the storage class held or not held, an operation that specifies if the action should be invoked at read, write, or read and write, and an action specification, entries in the action table enabled to be registered and removed through a set of predetermined functions,
wherein a thread executing in the processing unit and attempting access to said one or more regions of shared memory which have storage classes assigned and which storage classes the thread holds, causes one or more configurable actions to be triggered based on content of an array of storage classes and a configurable action table associated with said thread.

11. The system of claim 10 wherein the memory system structure maps one or more storage classes to respective one or more regions of shared memory at a selected level of granularity.

12. The system of claim 10, wherein the memory system structure includes a virtual memory system and a page table entry in the virtual memory system includes a field for specifying said one or more storage classes corresponding to memory address in the page table entry.

13. The system of claim 10, wherein said one or more configurable actions include synchronization actions.

14. The system of claim 10, wherein said one or more configurable actions include validation actions.

15. A program storage device readable by a machine, tangibly embodying a program of instructions executable by the machine to perform a method to trigger synchronization and validation actions at memory access, comprising:
identifying a storage class associated with a region of shared memory being accessed by a thread, in a memory system having the shared memory in which one or more regions at a predetermined granularity are assigned storage classes, the storage class represented as a fixed number of bits that identify the storage class, and in response to determining that no storage class is identified with the region of shared memory being accessed by the thread, issuing memory access in normal manner, and in response to identifying the storage class, performing:
determining whether the thread holds the storage class and acquiring the storage class automatically if the thread does not hold the storage class, the acquiring including holding the storage class in an array of storage classes in the thread's own memory context such that the array of storage classes is private to the thread and wherein the storage class is not exclusive to a thread such that the same storage class can be acquired by multiple threads;
identifying a programmable action associated with the storage class, the identifying including looking up an action table register storing one or more storage classes and associated programmable actions in response to identifying the storage class associated with a region of shared memory being accessed by a thread, the action table register being a process specific data structure that is configurable, including encoding of an action related to the storage class, a context that specifies whether the action should be taken upon the storage class held or not held, an operation that specifies if the action should be invoked at read, write, or read and write, and an action specification, entries in the action table register enabled to be registered and removed through a set of predetermined functions; and
triggering the programmable action based on the storage class assigned to the accessed shared memory location, the thread's array of storage classes, and type of memory access.

16. The program storage device of claim 15, wherein the programmable action includes one or more synchronization actions.

17. The program storage device of claim 15, wherein the programmable action includes one or more validation actions.

18. The program storage device of claim 15, further including:
    associating one or more storage classes respectively with one or more regions of shared memory.

19. The program storage device of claim 18, further including:
    using virtual memory mapping structure for associating said one or more storage classes respectively with one or more regions of shared memory.

20. The program storage device of claim 18, wherein said one or more storage classes is respectively associated with said one or more regions of shared memory at a selected level of granularity.

* * * * *